United States Patent
du Toit

(10) Patent No.: US 7,107,033 B2
(45) Date of Patent: Sep. 12, 2006

(54) SMART RADIO INCORPORATING PARASCAN® VARACTORS EMBODIED WITHIN AN INTELLIGENT ADAPTIVE RF FRONT END

(75) Inventor: Nicolaas D du Toit, Ellicott City, MD (US)

(73) Assignee: Paratek Microwave, Inc., Columbia, MD (US)

( * ) Notice: Subject to any disclaimer, the term of this patent is extended or adjusted under 35 U.S.C. 154(b) by 514 days.

(21) Appl. No.: 10/413,265

(22) Filed: Apr. 14, 2003

(65) Prior Publication Data

US 2003/0199286 A1    Oct. 23, 2003

Related U.S. Application Data

(60) Provisional application No. 60/452,470, filed on Mar. 6, 2003, provisional application No. 60/373,163, filed on Apr. 17, 2002.

(51) Int. Cl.
*H04B 1/10* (2006.01)

(52) U.S. Cl. .................. 455/296; 455/324; 455/183.1; 455/165.1; 455/258; 332/103; 341/143; 341/144; 375/350

(58) Field of Classification Search ............... 455/296, 455/183.1, 165.1, 258, 324, 550.1; 332/103; 375/350, 259, 247
See application file for complete search history.

(56) References Cited

U.S. PATENT DOCUMENTS

| | | | |
|---|---|---|---|
| 5,312,790 A | 5/1994 | Sengupta et al. | |
| 5,427,988 A | 6/1995 | Sengupta et al. | |
| 5,486,491 A | 1/1996 | Sengupta et al. | 501/137 |
| 5,487,186 A * | 1/1996 | Scarpa | 455/192.2 |
| 5,528,633 A * | 6/1996 | Halik et al. | 375/326 |
| 5,593,495 A | 1/1997 | Masuda et al. | 117/4 |
| 5,635,433 A | 6/1997 | Sengupta | 501/137 |
| 5,635,434 A | 6/1997 | Sengupta | 501/138 |
| 5,640,042 A | 6/1997 | Koscica et al. | 257/595 |
| 5,693,429 A | 12/1997 | Sengupta et al. | |
| 5,694,134 A | 12/1997 | Barnes | 343/700 |
| 5,697,081 A * | 12/1997 | Lyall et al. | 455/249.1 |
| 5,745,846 A * | 4/1998 | Myer et al. | 455/209 |
| 5,758,271 A * | 5/1998 | Rich et al. | 455/234.1 |
| 5,766,697 A | 6/1998 | Sengupta et al. | 427/585 |
| 5,830,591 A | 11/1998 | Sengupta et al. | 428/701 |
| 5,846,893 A | 12/1998 | Sengupta et al. | 501/137 |
| 5,886,867 A | 3/1999 | Chivukula et al. | 361/311 |
| 5,955,987 A * | 9/1999 | Murphy et al. | 342/357.06 |
| 5,990,766 A | 11/1999 | Zhang et al. | 333/205 |
| 5,999,802 A * | 12/1999 | Aschwanden | 455/196.1 |

(Continued)

Primary Examiner—Marceau Milord
(74) Attorney, Agent, or Firm—James S. Finn

(57) ABSTRACT

A smart radio incorporating Parascan® varactors embodied within an intelligent adaptive RF front end. More specifically, this is provided for by a smart radio incorporating Parascan® varactors embodied within an intelligent adaptive RF front end that comprises at least one tunable antenna; at least one antenna null steering facility associated with said at least on tunable antenna; at least one tunable duplexer receiving the output from and providing input to said at least one antenna null steering facility; a first tunable RF filter receiving the output from said at least one tunable duplexer and providing the input to an analog to digital converter, said analog to digital converter providing the input to a digital signal processor, the output of which is input for a digital to analog converter; a second tunable RF filter receiving the analog output of said digital to analog converter and providing an input to said at least one tunable duplexer.

25 Claims, 1 Drawing Sheet

U.S. PATENT DOCUMENTS

| | | | |
|---|---|---|---|
| 6,035,213 A * | 3/2000 | Tokuda et al. | 455/553.1 |
| 6,074,971 A | 6/2000 | Chiu et al. | 501/139 |
| 6,178,211 B1 * | 1/2001 | Whikehart et al. | 375/350 |
| 6,218,972 B1 * | 4/2001 | Groshong | 341/143 |
| 6,377,142 B1 | 4/2002 | Chiu et al. | 333/238 |
| 6,377,217 B1 | 4/2002 | Zhu et al. | 343/700 |
| 6,377,440 B1 | 4/2002 | Zhu et al. | 361/311 |
| 6,404,614 B1 | 6/2002 | Zhu et al. | 361/277 |
| 6,415,001 B1 * | 7/2002 | Li et al. | 375/259 |
| 6,492,883 B1 * | 12/2002 | Liang et al. | 333/132 |
| 6,514,895 B1 | 2/2003 | Chiu et al. | 501/137 |
| 6,525,630 B1 | 2/2003 | Zhu et al. | 333/205 |
| 6,531,936 B1 | 3/2003 | Chiu et al. | 333/164 |
| 6,535,076 B1 * | 3/2003 | Partridge et al. | 333/17.1 |
| 6,538,603 B1 | 3/2003 | Chen et al. | 342/372 |
| 6,556,102 B1 | 4/2003 | Sengupta et al. | 333/161 |
| 6,590,468 B1 | 7/2003 | du Toit et al. | 333/17.3 |
| 6,597,265 B1 | 7/2003 | Liang et al. | 333/204 |

* cited by examiner

SMART RADIO INCORPORATING PARASCAN® VARACTORS EMBODIED WITHIN AN INTELLIGENT ADAPTIVE RF FRONT END

CROSS-REFERENCE TO RELATED APPLICATION

This application claims the benefit of priority under 35 U.S.C Section 119 from U.S. Provisional Application Ser. No. 60/373,163, filed Apr. 17, 2002, entitled, TUNABLE MODULES FOR FREQUENCY AGILE RECEIVERS, by Ekelman et al., assigned to Paratek Microwave, Inc. and U.S. Provisional Application Ser. No. 60/452,470, filed Mar. 6, 2003, entitled, SMART RADIO INCORPORATING PARASCAN® VARACTORS EMBODIED WITHIN AN INTELLIGENT ADAPTIVE RF FRONT END, by du Toit et al, assigned to Paratek Microwave, Inc. the disclosures of which are hereby incorporated by reference in their entirety for all purposes.

BACKGROUND OF THE INVENTION

This invention relates to soft-ware defined radios and, more specifically, software defined radios using tunable material for significant system improvements.

Following a modern trend in radio design whereby radios are becoming increasingly flexible and software definable, more processing is done in the digital domain and preferably, in software. Large chunks of the RF spectrum are digitized at once, enabling an open architecture with regards to RF waveforms.

In the current expanding wireless communication environment, systems require both high data rates and high processing gains. Wideband transceivers are essential to realize these features demanded by wireless communication systems. In fact, it is believed that the next generation of wireless transceivers, for both multimedia applications and for wireless networking, must be wideband systems.

In addition, a large variety of digital systems have recently emerged in the wireless market. To combine the emerging digital systems with existing analog systems, and to reduce the cost of a wireless system, a new technology, i.e., a wideband software-defined radio (SDR) base station system, is developing. Essentially, in a software-defined radio base station transmitter, digital base-band channels are processed separately. All channels are then combined together, and the combined signal (i.e., a wideband multiple channel signal), after a digital to analog conversion, is then up-converted to RF by a wideband multiple channel frequency converter.

The current performance of analog to digital converters (A/D's) and digital to analog converters allows instantaneous RF bands of 10–30 Megahertz to be handled with spurious free dynamic range (SFDR) not exceeding 100 dB and signal to noise ratio (SNR) not exceeding 75 dB. The instantaneous RF band can be (software) tuned anywhere up to about 200 MHz and even several GHz in experimental systems.

However, for a software-defined radio (SDR) to be truly flexible and interoperable, operation over the entire 30–2000 MHz band is required. Receive signal levels may be as low as −120 dBm and as high as 0 dBm in a hostile environment, demanding a 120 dB dynamic range. Furthermore, emissions from colocated transmitters could amount to 100 Watt at the SDR receiver antenna. Co-site interference would thus require a dynamic range of more than 170 dB.

Despite advances in converter technology bringing a doubling of instantaneous bandwidth and sampling frequency every few years, SDR in its pure form will not be a practical reality for quite some time. As had been the case with traditional radios since the invention of the superheterodyne receiver almost a century ago, the analog RF front end is still looked upon to provide the required tuning, selectivity and interference rejection. Thus, there is a strong need in the RF industry and more particularly in the software-defined radio technology industry for a flexible and interoperable operation over a very wide bandwidth and to enable a dynamic range of more than 170 dB and solves the problem in radio communications of resolving (separating) friendly, wanted signals, from interfering or unwanted signals and noise.

SUMMARY OF THE INVENTION

The present invention includes a smart radio incorporating Parascan® varactors embodied within an intelligent adaptive RF front end. More specifically, this is provided for by a smart radio incorporating Parascan® varactors embodied within an intelligent adaptive RF front that comprises at least one tunable antenna; at least one antenna null steering facility associated with said at least on tunable antenna; at least one tunable duplexer receiving the output from and providing input to said at least one antenna null steering facility; a first tunable RF filter receiving the output from said at least one tunable duplexer and providing the input to an analog to digital converter, said analog to digital converter providing the input to a digital signal processor, the output of which is input for a digital to analog converter; a second tunable RF filter receiving the analog output of said digital to analog converter and providing an input to said at least one tunable duplexer.

Further, the present invention provides for a method of separating desired signals from interfering or undesired signals and noise using a smart radio that incorporates Parascan® varactors embodied within an intelligent adaptive RF front end, comprising the steps of receiving RF signals with at least one tunable antenna; outputting said RF signal to at least one antenna null steering facility; passing said RF signal to at least one tunable duplexer, wherein the output of said at least one tunable duplexer is passed to a first RF filter, the output of said first tunable RF filter providing the input to an analog to digital converter; converting said RF signal in said analog to digital converter to a digital signal for processing in a digital signal processor; and outputting processed digital information from said digital signal processor to a digital to analog converter which is thereafter passed to a second tunable RF filter, the output of which is passed back to said tunable duplexer.

DESCRIPTION OF THE PREFERRED EMBODIMENT

Figure 1:
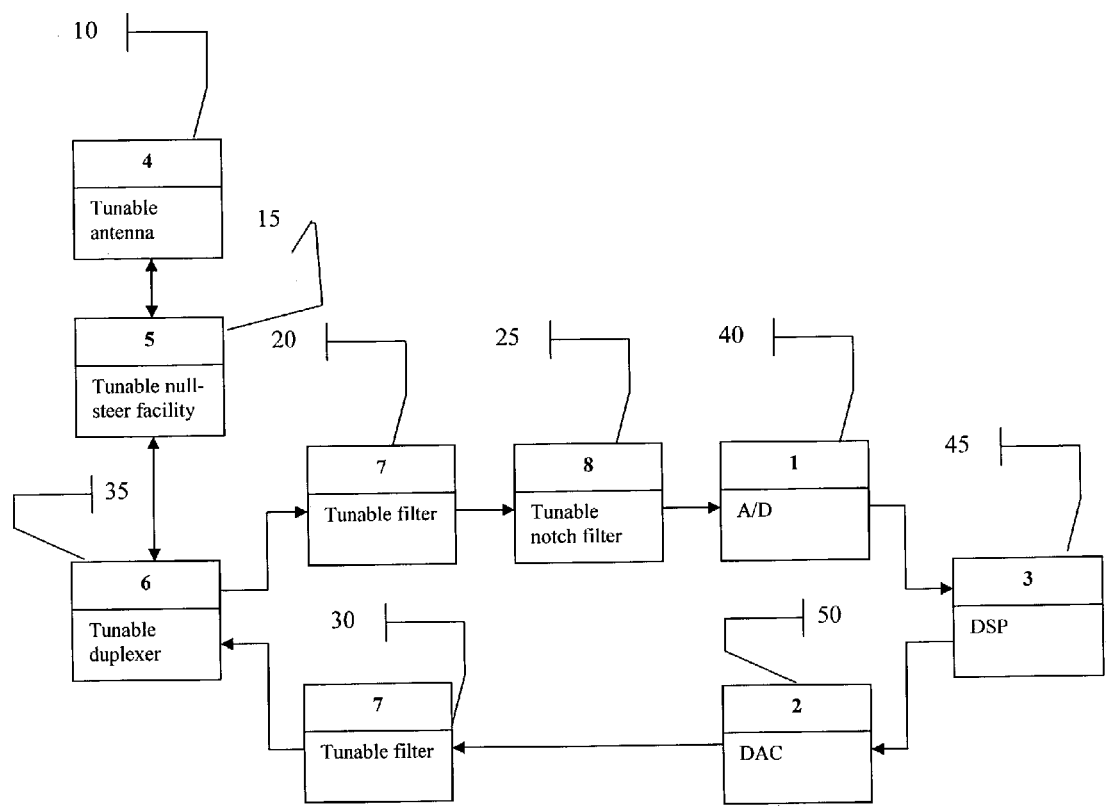
FIG. 1 is a functional block diagram of a Smart Radio incorporating Parascan® varactors in an intelligent adaptive RF front end.

Although tunable materials in general can be utilized and are anticipated by the present invention, one tunable material that is described in a preferred embodiment of the present invention is Parascan®. Parascan® is a trademarked tunable dielectric material developed by Paratek Microwave, Inc., the assignee of the present invention. Tunable dielectric materials are the materials whose permittivity (more commonly called dielectric constant) can be varied by varying the strength of an electric field to which the materials are subjected or immersed. Examples of such materials can be found in U.S. Pat. No. 5,312,790, 5,427,988, 5,486,491, 5,693,429 and 6,514,895. These materials show low dielectric loss and high tunability. Tunability is defined as the fractional change in the dielectric constant with applied voltage. The patents above are incorporated into the present application by reference in their entirety. Parascan® voltage tunable dielectric materials are embodied within software controlled tunable filters, diplexers, matching networks and phased-array antennas, tunable notch filters, nullsteer antennas, smart antennas, tunable phase shifters, voltage controlled oscillators (VCO's) and voltage tunable dielectric capacitors. The terms Parascan® voltage tunable capacitors, Parascan® variable capacitors, Parascan® tunable dielectric capacitors and Parascan® varactors have the same meaning and are interchangeable herein.

The present invention provides a comprehensive solution to the problem in radio communications of resolving (separating) friendly, wanted signals, from interfering or unwanted signals and noise. The comprehensiveness of the solution lies in the multitude of dimensions or domains that are utilized for interference suppression, such as:
1. Time: code division multiple access (CDMA) and time division multiple access (TDMA)
2. Frequency: frequency division multiple access (FDMA)
3. Space: CDMA and direction of arrival (DOA).

Protection against high power interference falls in two categories:
1. Clipping or limiting devices that prevent excessive power levels from damaging sensitive equipment. By nature, such devices are non-linear, causing the protected receiver to be desensitized while the protection is active, or the protected transmitter to splatter adjacent bands due to inter-modulation.
2. Devices that filter or divert unwanted (high power) signals, rendering the performance of the protected receiver or transmitter essentially undiminished.

The present invention, a smart radio incorporating Parascan varactors embodied within an intelligent adaptive RF front end (IA RFFE) works best in category number 2 above.

This invention will allow modern, software-defined radios (SDR) to be truly flexible and interoperable over the entire 30–2000 MHz band. In congested environments where receive signal levels may vary between −120 dBm and 0 dBm, the required 120 dB dynamic range will be provided. Severe co-site interference exceeding 100 W will be mitigated while maintaining system flexibility and receiver sensitivity.

The highest levels of interference may be expected from co-located emitters. Since these are most likely belonging to the same owner as the system to be protected, one could assume that such emitters be cooperative having known frequencies, times of transmission and directions of arrival. Co-location problems are traditionally mitigated using diplexers, receiver blanking, fixed pre-select filters, and antenna isolation. In this case, an intelligent adaptive RF front end will provide added interference rejection.

Lower levels of interference may be expected from non-co-located emitters. However, these may not belong to the same owner as the system to be protected and would most likely be un-cooperative, having unknown frequencies, times of transmission and directions of arrival. Thus, the traditional methods mentioned above would not be effective. In this situation in particular, the present invention with an intelligent adaptive RF front end would therefore be the most desirable solution.

FIG. 1 is a functional block diagram of a Smart Radio incorporating Parascan® varactors in an intelligent adaptive RF front end (shown as 10–35 in FIG. 1). In projecting the performance of the proposed AI RFFE, assume the AI RFFE is followed by a state-of-the art (digital) front-end (shown as 40–50 in FIG. 1) comprising an analog to digital converter (A/D) 40, a digital to analog converter (DAC) 50 and a digital signal processor (DSP) 45, providing at least 100 dB spurious free dynamic range.

The AI RFFE shown in FIG. 1, comprises an integrated package incorporating a tunable antenna 10, covering the entire frequency band of interest, while maintaining a reasonable amount of gain. The RF energy containing the frequency band desired is passed to an antenna null-steering facility 15, providing 20 dB of interference rejection for a signal and interferer separated by at least 40° in azimuth. This feature would be particularly useful against in-band and same-frequency interference, extending the SFDR dynamic range of the system to 120 dB. Several nulls could be steered automatically and adaptively. The essential components of a steerable antenna are tunable phase shifters.

The signal remaining after the in-band and same-frequency interference has been reduced by the antenna null-steering facility 15 is passed to a tunable duplexer 35, allowing a single antenna to be used in a full-duplex system. With transmit and receive frequencies separated by more than 10% in frequency and the pass band around 2%, 70 dB of isolation, or 170 dB SFDR could be obtained.

The output of the tunable duplexer 35 is passed to tunable RF filter 20, which rejects out-of band interference by more than 70 dB, thus increasing the dynamic range for the system to 170 dB. Tunable notch filter 25, rejecting in-band, off-frequency interference and notches with 3 dB bandwidths of 8% and notch depths of around 20 dB are feasible, extending the SFDR dynamic range of the system to 120 dB. Several notches could be steered automatically and adaptively.

As described above, this front end portion of the intelligent adaptive RF is followed by a state-of-the art digital section (shown as 40–50 in FIG. 1) comprising an analog to digital converter (A/D) 40, a digital to analog converter (DAC) 50 and a digital signal processor (DSP) 45, providing at least 100 dB spurious free dynamic range. The output of tunable notch filter 25 is input to analog to digital (A/D) 40 where the signals are converted from analog to digital for processing in digital signal processor 45. The output of which is inputted into the digital to analog converter (DAC) for transmission to second tunable filter 30.

So as can be seen from the above system, antenna null-steering and notch filtering combining rejection of in-band, off-frequency interference for a total SFDR of 140 dB.

While the present invention has been described in terms of what are at present believed to be its preferred embodiments, those skilled in the art will recognize that various modifications to the disclose embodiments can be made without departing from the scope of the invention as defined by the following claims.

What is claimed is:
1. A apparatus, comprising:
at least one tunable antenna;
at least one antenna null steering facility associated with said at least one tunable antenna;

at least one tunable duplexer receiving the output from and providing input to said at least one antenna null steering facility;

a first tunable RF filter receiving the output from said at least one tunable duplexer and providing the input to an analog to digital converter, said analog to digital converter providing the input to a digital signal processor, the output of which is input for a digital to analog converter; and a second tunable RF filter receiving the analog output of said digital to analog converter and providing an input to said at least one tunable duplexer.

2. The apparatus of claim 1, wherein embedded in said at least one tunable antenna are Parascan® voltage tunable dielectric materials.

3. The apparatus of claim 1, wherein embedded in said least one antenna null steering facility are Parascan® voltage tunable dielectric materials.

4. The apparatus of claim 1, wherein embedded in said at least one tunable duplexer are Parascan® voltage tunable dielectric materials.

5. The apparatus of claim 1, wherein embedded in said first tunable RF filter are Parascan® voltage tunable dielectric materials.

6. The apparatus of claim 1, wherein embedded in said first tunable RF filter are Parascan® voltage tunable dielectric materials.

7. The apparatus of claim 1, wherein embedded in said second tunable RE filter are Parascan® voltage tunable dielectric materials.

8. The apparatus of claim 1, wherein said tunable notch filter rejects in-band, off-frequency interference and notches with 3 dB bandwidths of 8% and notch depths of around 20 dB extending the SFDR dynamic range of the system to 120 dB.

9. An intelligent adaptive RE front end of a smart radio, comprising:
   at least one tunable antenna;
   at least one antenna null steering facility associated with said at least one tunable antenna;
   at least one tunable duplexer receiving the output from and providing input to said at least one antenna null steering facility;
   a first tunable RF filter receiving the output from said at least one tunable duplexer and providing the input to a digital section; and
   a second tunable RF filter receiving the output of said digital section and providing an input to said at least one tunable duplexer.

10. The intelligent adaptive RF front end of a smart radio of claim 9, wherein said digital section further comprises:
   an analog to digital converter in communication with said tunable duplexer;
   a digital signal processor receiving digital information from said analog to digital converter; and
   a digital to analog converter for receiving digital information from said digital signal processor and providing said second tunable filter with an analog signal.

11. The intelligent adaptive RF front end of a smart radio of claim 9, wherein embedded in said at least one tunable antenna are Parascan® voltage tunable dielectric materials.

12. The intelligent adaptive RF front end of a smart radio of claim 9, wherein embedded in said least one antenna null steering facility are Parascan® voltage tunable dielectric materials.

13. The intelligent adaptive RF front end of a smart radio of claim 9, wherein embedded in said at least one tunable duplexer are Parascan® voltage tunable dielectric materials.

14. The intelligent adaptive RF front end of a smart radio of claim 9, wherein embedded in said first tunable RF filter are Parascan® voltage tunable dielectric materials.

15. The intelligent adaptive RF front end of a smart radio of claim 9, wherein embedded in said first tunable RF filter are Parascan® voltage tunable dielectric materials.

16. The intelligent adaptive RF front end of a smart radio of claim 9, wherein embedded in said second tunable RF filter are Parascan® voltage tunable dielectric materials.

17. The intelligent adaptive RF front end of a smart radio of claim 9, wherein said tunable notch filter rejects in-band, off-frequency interference and notches with 3 dB bandwidths of 8% and notch depths of around 20 dB extending the SFDR dynamic range of the system to 120 dB.

18. A method, comprising:
   receiving RF signals with at least one tunable antenna;
   outputting said RF signal to at least one antenna null steering facility;
   passing said RF signal to at least one tunable duplexer, wherein the output of said at least one tunable duplexer is passed to a first RF filter, the output of said first tunable RF filter providing the input to an analog to digital converter;
   converting said RF signal in said analog to digital converter to a digital signal for processing in a digital signal processor; and
   outputting processed digital information from said digital signal processor to a digital to analog converter, which is thereafter passed to a second tunable RF filter, the output of which is passed back to said tunable duplexer.

19. The method of claim 18, wherein embedded in said at least one tunable antenna are Parascan® voltage tunable dielectric materials.

20. The method of claim 18, wherein embedded in said least one antenna null steering facility are Parascan® voltage tunable dielectric materials.

21. The method of claim 18, wherein embedded in said at least one tunable duplexer are Parascan® voltage tunable dielectric materials.

22. The method of claim 18, wherein embedded in said first tunable RF filter are Parascan® voltage tunable dielectric materials.

23. The method of claim 18, wherein embedded in said first tunable RF filter are Parascan® voltage tunable dielectric materials.

24. The method of claim 18, wherein embedded in said second tunable RF filter are Parascan® voltage tunable dielectric materials.

25. The method of claim 18, wherein said tunable notch filter rejects in-band, off-frequency interference and notches with 3 dB bandwidths of 8% and notch depths of around 20 dB extending the SFDR dynamic range of the system to 120 dB.

* * * * *